(12) United States Patent
Smolders

(10) Patent No.: US 6,378,808 B1
(45) Date of Patent: Apr. 30, 2002

(54) DEVICE FOR RELEASING A PARACHUTE

(76) Inventor: Jo Smolders, Neerstraat 181, 3150 Wespelaar (BE)

( * ) Notice: Subject to any disclaimer, the term of this patent is extended or adjusted under 35 U.S.C. 154(b) by 0 days.

(21) Appl. No.: 09/664,737

(22) Filed: Sep. 19, 2000

(30) Foreign Application Priority Data

Sep. 20, 1999 (EP) ............................................. 99870189

(51) Int. Cl.[7] ............................................. B64D 17/56
(52) U.S. Cl. ...................................... 244/149; 244/147
(58) Field of Search .................................. 244/149, 150, 244/152, 147, 122 AE, 122 AF

(56) References Cited

U.S. PATENT DOCUMENTS

| | | | | |
|---|---|---|---|---|
| 3,667,705 A | * | 6/1972 | Snyder | |
| 4,858,856 A | * | 8/1989 | Cloth | |
| 5,671,162 A | * | 9/1997 | Werbin | |
| 5,825,667 A | * | 10/1998 | Van Den Broek | |
| 5,881,974 A | * | 3/1999 | Larsen et al. | |

* cited by examiner

*Primary Examiner*—Charles T. Jordan
*Assistant Examiner*—T. Dinh
(74) *Attorney, Agent, or Firm*—Dorsey & Whitney LLP

(57) ABSTRACT

The present invention relates to a parachute release device provided to be mounted on a parachute, which parachute is provided to be attached to an object. The device has a data processing system having a release signal output and a memory provided for storing data. The data processing system is provided for generating a release signal for opening a parachute. The device further has altitude determining device connected to said data processing system and provided for determining altitude values; and time determination means provided for determining the free fall duration as from the start of the dive. The memory is provided for storing a plurality of series of theoretical dive data, said theoretical dive data indicating for each distance value a corresponding theoretical time. The data processing system is further provided for selecting a series of theoretical dive data in function of the determined altitude values and the determined free fall duration.

20 Claims, 5 Drawing Sheets

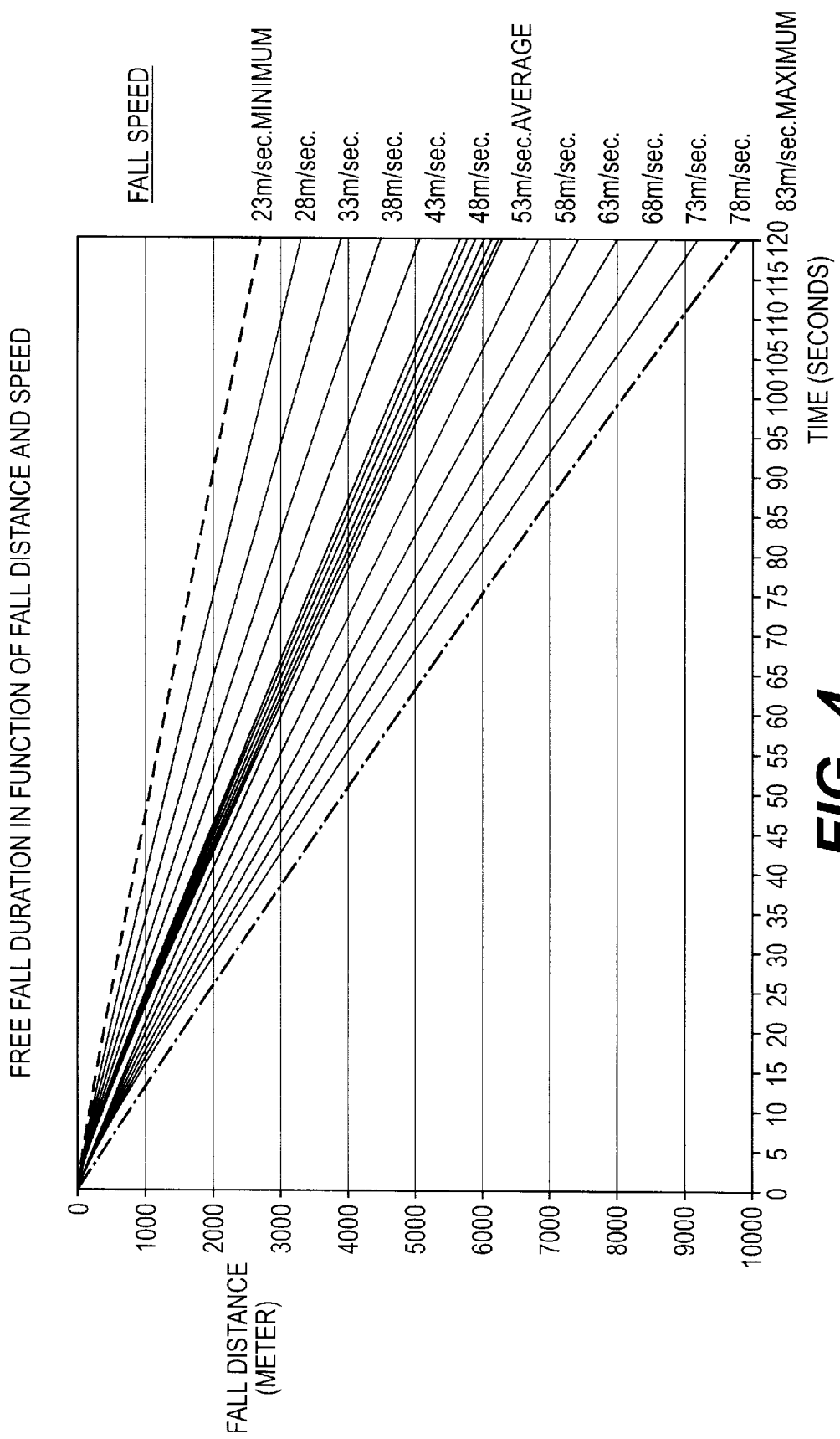

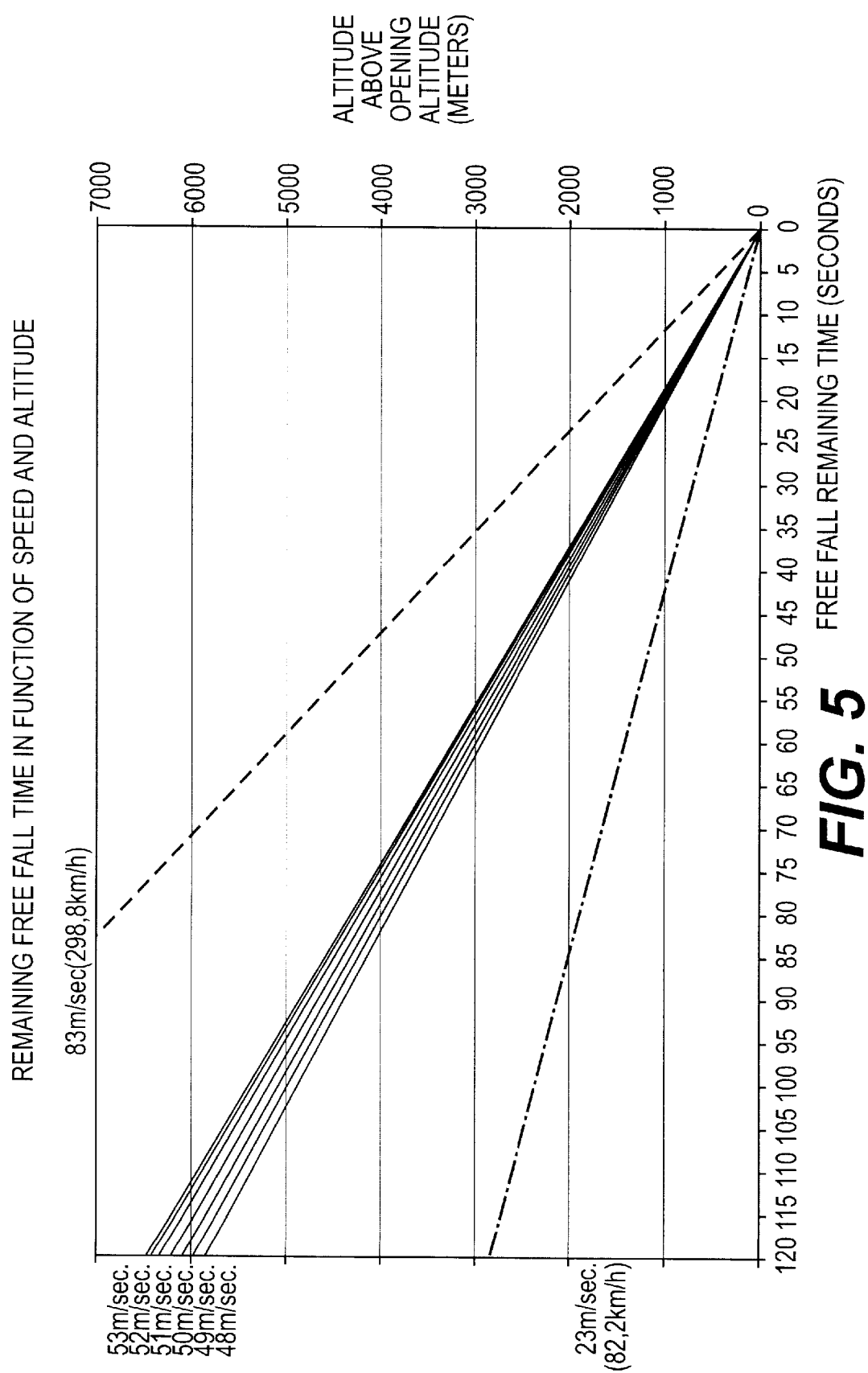

DEVICE FOR RELEASING A PARACHUTE

TECHNICAL FIELD

The present invention relates to a device for releasing a parachute.

An electronic device for releasing a parachute is known from U.S. Pat. No. 4,858,856. According to this known device, a pressure sensor is used for determining the initial altitude value and for determining further pressure values. When a predetermined pressure has been reached, the device will release the parachute if a predetermined pressure change rate has been exceeded. Since the speed of a falling object depends from a number of parameters, such as for example the weight of the object attached to the parachute, the air resistance of the object, ect. the known device is not very accurate.

This problem of accuracy has been solved with the device according to EP-A-0 785 130 by using an accelerometer in addition to a pressure sensor. Such a device is however more cumbersome and expensive.

SUMMARY

The object of the invention is to provide an alternative device for releasing a parachute which is still reliable and relatively inexpensive.

To this object, the device for releasing the parachute according to the invention comprises a data processing system having a release signal output and a memory provided for storing data, said data processing system being provided for generating a release signal for opening said parachute; altitude determining means connected to said data processing system and provided for determining altitude values; and time determination means provided for determining the free fall duration as from the start of the dive. Said memory is provided for storing a plurality of series of theoretical dive data, said theoretical dive data indicating for each distance value a corresponding theoretical time. Said data processing system is further provided for selecting a series of theoretical dive data in function of the determined altitude values and the determined free fall duration.

In particular, said distance value indicates a fall distance and said theoretical time indicates a free fall duration. According to an alternative, said distance value indicates an altitude value and said theoretical time indicates a theoretical free fall remaining time. The data processing system is provided for selecting a series of theoretical dive data in function of the determined altitude values and the determined free fall duration by performing the following steps. A default series of theoretical dive data among said series of theoretical dive data is selected as active series of theoretical dive data. An initial altitude value ($h_{n,ini}$) is stored when said dive is started. On the basis of said active series of theoretical dive data and said initial altitude value, an initial theoretical free fall remaining time ($t_{rem,theor,ini}$) is determined. On the basis an actual altitude value ($h_n$) and the initial altitude value ($h_{n,ini}$) the corresponding fall distance ($\Delta h_{fall}$) is determined. On the basis of said active series of theoretical dive data and said fall distance ($\Delta h_{fall}$) a theoretical free fall duration ($t_{fall,theor}$) is determined. A sum of a predetermined number of differences between said theoretical free fall duration ($t_{fall,theor}$) with the free fall duration ($t_{fall,meas}$) determined with the time determination means is determined. Upon establishing that said sum exceeds a threshold value, a further series of theoretical dive data is selected as active series of theoretical dive data. Said release signal is generated when said determined free fall duration reaches said initial theoretical free fall remaining time and a given altitude change rate is exceeded.

According to an alternative, said distance value indicates an altitude value and said theoretical time indicates a theoretical free fall remaining time. In that case, the theoretical free fall duration ($t_{fall,theor}$) is determined by first determining on the basis of the active theoretical dive data, the corresponding theoretical free fall remaining time ($t_{rem,theor}$) and then on the basis of the initial theoretical free fall remaining time ($t_{rem,theor,ini}$) and the corresponding theoretical free fall remaining time ($t_{rem,theor}$).

The device according to the invention allows to switch from one series of theoretical dive data to another series, which will better match with the measured data. This allows to determine more accurately the remaining free fall time.

The predetermined number of differences can be equal to one. However, for increasing the accuracy of the results, the predetermined number is at least 3, and preferably at least 10.

Preferably, the device further comprises means for generating a further warning signal upon establishing that said determined altitude value has crossed a threshold altitude value. This informs the user, upon climbing, that the device is operating properly.

Before releasing the parachute, it is desirable to warn the skydiver that he approaches the danger altitude at which the parachute should be opened. This is achieved by providing that the device further comprises means for generating a warning signal upon establishing that the difference between the initial theoretical free fall remaining time and the determined free fall duration has reached a threshold duration value.

Selection of different default theoretical dive data is achieved by providing that the device further comprises means for selecting a jump mode, each jump mode being dedicated to default theoretical dive data. Preferably, said given altitude change rate is in function of the selected jump mode. This enables to differentiate a dangerous situation between a student, an expert and tandem skydivers.

DESCRIPTION OF THE DRAWINGS

Other details and advantages of the invention will become apparent from the following description of a parachute release device according to the invention. The reference numerals relate to the figures annexed hereto.

FIG. 4 is a graph indicating the free fall duration in function of the fall distance and the speed.

FIG. 5 is a graph indicating the free fall remaining time in function of the altitude above the opening altitude and the speed.

DETAILED DESCRIPTION

Figure 1:
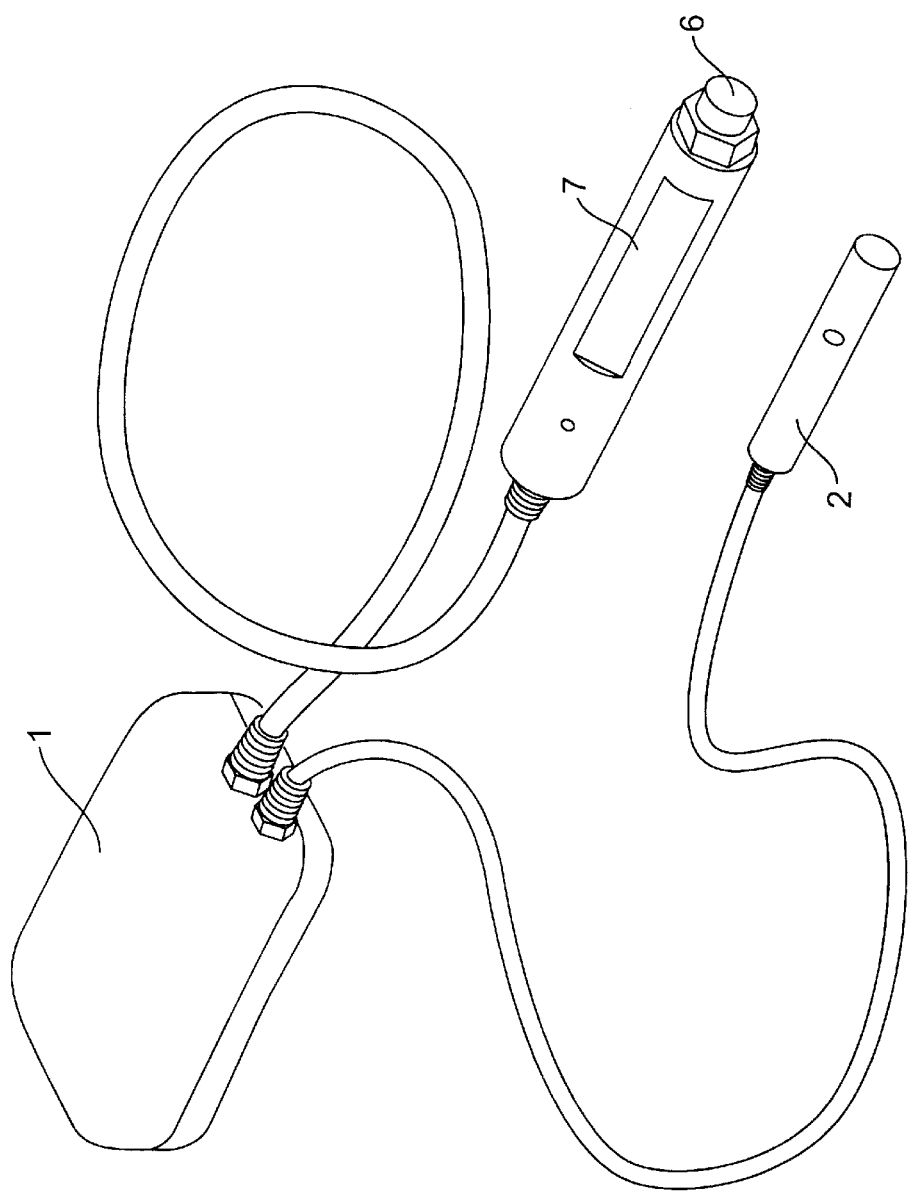
FIG. 1 is a perspective view of a device according to the invention.
Figure 2:
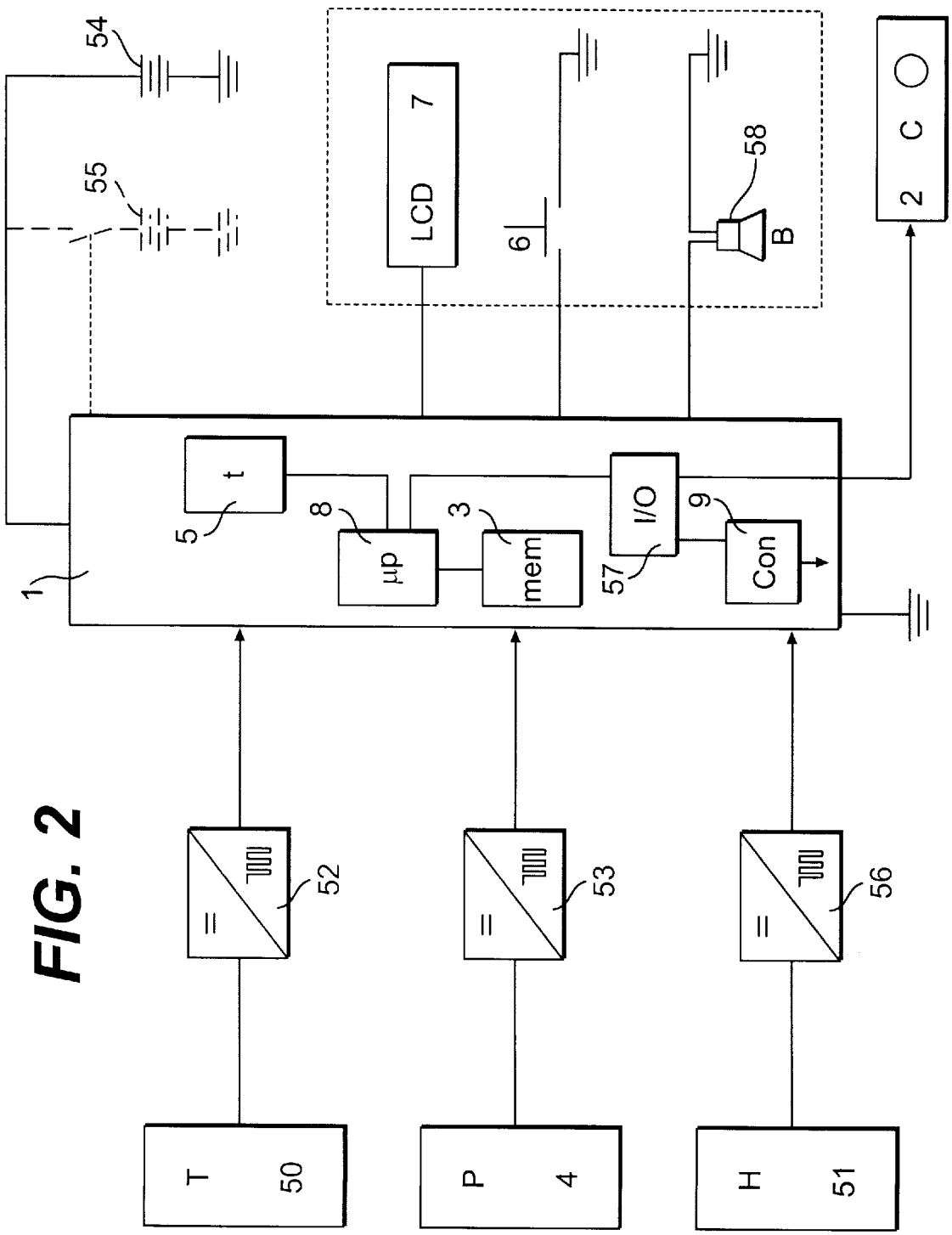
FIG. 2 is a block diagram of the hardware of the device shown in FIG. 1.

Referring to FIGS. 1 and 2, the device according to the invention comprises a data processing system 1 with a microprocessor 8, a release signal output 2 and a memory 3. The memory 3 is provided for storing a series of theoretical dive data, as explained further in detail. The data processing system 1 is provided for generating a release signal, transferring the release signal to a cutter 2 through the intermediary of an I/O interface 57 connected to the microprocessor 8. Upon receipt of the release signal, the cutter will open the parachute (not shown), onto which the device is mounted. The parachute is provided to be attached to an object, in particular a skydiver. It is also conceivable to use the device according to the invention when the parachute is attached to other objects. The data processing system 1 is further connected to a beeper 58, provided under the opening of the user interface shown in FIG. 1. All the electronics is provided in a housing as shown in FIG. 1, which is preferably shielded to prevent interference.

The cutter 2 preferably comprises a moving cutting element in hard steel provided to hit a an anvil or support in hard steel. The material is chosen to be unbreakable and leak proof. The stroke of the cutting element is approximately 8 mm. The cutter preferably cuts material, in particular a cable, having a diameter up to approximately 5 mm. As shown in FIG. 1, the cutter comprises an opening through which the cable passes.

The device further comprises a set button 6 provided to switch the device from idle position to an operating position. This is done at ground level. Preferably, the set button must be switched according to a predetermined sequence within predetermined time limits. This is provided to avoid that the device is switched accidentally during the dive.

A pressure sensor 4, for example an absolute pressure sensor measuring pressures from 0 to 1034 mbar (0 to 15 PSI), is connected via an analogue-digital converter to the data processing system 1. The pressure sensor is provided for measuring pressure values. From the measured pressure values, altitude values can be determined since the altitude is proportional to the pressure. Time determining means 5, for example formed by a counter as a part of the microprocessor, are provided for counting the jump duration time as from the start of the jump.

Optionally, a display 7 is connected to said data processing system, provided for displaying messages and values. A connector 9 is connected to the I/O interface 9, allowing to retrieve data from the device for further processing on another device, such as a PC.

In addition to the pressure sensor, the height determining means may comprise a temperature sensor 50 and a humidity sensor 51. These sensors allow to correct the altitude value deducted from the measured pressure on the basis of temperature and humidity values. This technique of altitude determination is however known as such. The sensors are connected to the data processing system through the intermediary of A/D converters 51, 53 and 56. It will be clear that if use is made of digital sensors, the A/D converters are not required.

A main power supply 54 is connected to the data processing system 1. Preferably, there is provided a backup power supply 55 in case of breakdown of the main power supply. This feature is useful when the batteries of the main power are to be replaced. When the backup power supply is activated, a warning is given on the display of the device.

According to a first embodiment, the series of theoretical dive data stored in the memory 3 indicates, for each fall distance, a theoretical free fall duration. For example, a series of dive data as indicated in Table 1 could be stored in the memory. In the example given thirteen series of theoretical dive data are shown, each corresponding to a fall speed. It will be clear that more or less series are also conceivable. The more the number of series, the more the results will be accurate.

TABLE 1

Free fall duration in fuction of the free fall distance and speed

| Time in sec. | Series 23 Minimum | Series 28 | Series 33 | Series 38 | Series 43 | Series 48 | Series 53 Average |
|---|---|---|---|---|---|---|---|
| | FREE FALL DISTANCE (meters) | | | | | | |
| 0 | 0 | 0 | 0 | 0 | 0 | 0 | 0 |
| 5 | 48.4 | 58.9 | 69.5 | 80 | 90.5 | 101 | 111.6 |
| 10 | 150.8 | 183.6 | 216.3 | 249.1 | 281.9 | 314.7 | 347.5 |
| 15 | 265.9 | 323.7 | 381.4 | 439.3 | 497 | 554.9 | 612.6 |
| 20 | 382.3 | 465.4 | 548.4 | 631.6 | 714.7 | 797.8 | 880.9 |
| 25 | 498.7 | 607.1 | 715.4 | 823.9 | 932.3 | 1040.7 | 1149.1 |
| 30 | 615.1 | 748.8 | 882.4 | 1016.2 | 1149.9 | 1283.7 | 1417.3 |
| 35 | 731.5 | 890.5 | 1049.4 | 1208.5 | 1367.5 | 1526.6 | 1685.5 |
| 40 | 847.9 | 1032.2 | 1216.4 | 1400.9 | 1585.1 | 1769.5 | 1953.8 |
| 45 | 964.3 | 1173.9 | 1383.4 | 1593.2 | 1802.7 | 2012.5 | 2222 |
| 50 | 1080.8 | 1315.6 | 1550.4 | 1785.5 | 2020.3 | 2255.4 | 2490.2 |
| 55 | 1197.2 | 1457.3 | 1717.4 | 1977.8 | 2237.9 | 2498.3 | 2758.4 |
| 60 | 1313.6 | 1599 | 1884.4 | 2170.1 | 2455.5 | 2741.2 | 3026.7 |
| 65 | 1430 | 1740.7 | 2051.4 | 2362.4 | 2673.1 | 2984.2 | 3294.9 |
| 70 | 1546.4 | 1882.4 | 2218.4 | 2554.8 | 2890.8 | 3227.1 | 3563.1 |
| 75 | 1662.8 | 2024.1 | 2385.4 | 2747.1 | 3108.4 | 3470 | 3831.3 |
| 80 | 1779.2 | 2165.8 | 2552.4 | 2939.4 | 3326 | 3713 | 4099.6 |
| 85 | 1895.6 | 2307.5 | 2719.4 | 3131.7 | 3543.6 | 3955.9 | 4367.8 |
| 90 | 2012 | 2449.2 | 2886.4 | 3324 | 3761.2 | 4198.8 | 4636 |
| 95 | 2128.4 | 2590.9 | 3053.4 | 3516.3 | 3978.8 | 4441.8 | 4904.2 |
| 100 | 2244.8 | 2732.6 | 3220.4 | 3708.7 | 4196.4 | 4684.7 | 5172.5 |
| 105 | 2361.3 | 2874.3 | 3387.4 | 3901 | 4414 | 4927.6 | 5440.7 |
| 110 | 2477.7 | 3016 | 3554.4 | 4093.3 | 4631.6 | 5170.6 | 5708.9 |
| 115 | 2594.1 | 3157.7 | 3721.4 | 4285.6 | 4849.2 | 5413.5 | 5977.1 |
| 120 | 2710.5 | 3299.4 | 3888.4 | 4477.9 | 5066.9 | 5656.4 | 6245.4 |
| FALL SPEED | 23 m/sec 82.2 km/h | 28 m/sec 100.8 km/h | 33 m/sec 118.8 km/h | 38 m/sec. 136.8 km/h | 43 m/sec 154.8 km/h | 48 m/sec 172.8 km/h | 53 m/sec 190.8 km/h |

TABLE 1-continued

Free fall duration in fuction of the free fall distance and speed

FREE FALL DISTANCE (meters)

| Time in sec. | Series 58 | Series 63 | Series 68 | Series 73 | Series 78 | Series 83 Maximum |
|---|---|---|---|---|---|---|
| 0 | 0 | 0 | 0 | 0 | 0 | 0 |
| 5 | 122.1 | 132.6 | 143.1 | 153.7 | 164.2 | 174.7 |
| 10 | 380.2 | 413 | 445.8 | 478.6 | 511.4 | 544.1 |
| 15 | 670.4 | 728.3 | 786 | 843.9 | 901.6 | 959.4 |
| 20 | 963.9 | 1047.1 | 1130.2 | 1213.3 | 1296.4 | 1379.4 |
| 25 | 1257.5 | 1365.9 | 1474.3 | 1582.8 | 1691.1 | 1799.5 |
| 30 | 1551 | 1684.8 | 1818.4 | 1952.2 | 2085.9 | 2219.5 |
| 35 | 1844.5 | 2003.6 | 2162.6 | 2321.7 | 2480.6 | 2639.6 |
| 40 | 2138 | 2322.4 | 2506.7 | 2691.1 | 2875.4 | 3059.6 |
| 45 | 2431.5 | 2641.3 | 2850.8 | 3060.6 | 3270.1 | 3479.6 |
| 50 | 2725 | 2960.1 | 3194.9 | 3430 | 3664.9 | 3899.7 |
| 55 | 3018.6 | 3279 | 3539.1 | 3799.5 | 4059.6 | 4319.7 |
| 60 | 3312.1 | 3597.8 | 3883.2 | 4168.9 | 4454.3 | 4739.8 |
| 65 | 3605.6 | 3916.6 | 4227.3 | 4538.4 | 4849.1 | 5159.8 |
| 70 | 3899.1 | 4235.5 | 4571.5 | 4907.8 | 5243.8 | 5579.8 |
| 75 | 4192.6 | 4554.3 | 4915.6 | 5277.3 | 5638.6 | 5999.9 |
| 80 | 4486.1 | 4873.1 | 5259.7 | 5646.7 | 6033.3 | 6419.9 |
| 85 | 4779.7 | 5192 | 5603.9 | 6016.2 | 6428.1 | 6839.9 |
| 90 | 5073.2 | 5510.8 | 5948 | 6385.6 | 6822.8 | 7260 |
| 95 | 5366.7 | 5829.7 | 6292.1 | 6755.1 | 7217.6 | 7680 |
| 100 | 5660.2 | 6148.5 | 6636.3 | 7124.5 | 7612.3 | 8100.1 |
| 105 | 5953.7 | 6467.3 | 6980.4 | 7494 | 8007 | 8520.1 |
| 110 | 6247.3 | 6786.2 | 7324.5 | 7863.4 | 8401.8 | 8940.1 |
| 115 | 6540.8 | 7105 | 7668.7 | 8232.9 | 8796.5 | 9360.2 |
| 120 | 6834.3 | 7423.8 | 8012.8 | 8602.3 | 9191.3 | 9780.2 |
| FALL SPEED | 58 m/sec 208.8 km/h | 63 m/sec 226.8 km/h | 68 m/sec 244.8 km/h | 73 m/sec 262.8 km/h | 78 m/sec 280.8 km/h | 83 m/sec 298.8 km/h |

These series of data shown in table 1 result in a graph as illustrated in FIG. 4.

Assume a professional skydiver uses the device. The selection of the jump mode will be described further with reference to FIG. 3. Assume the jump is started at a initial altitude value equal to, 2,700 meters. It should be noted that the altitude value is the altitude with reference to the ground level. The data processing system will select for example the series 53, corresponding to a fall speed of 53 m/s as active series of theoretical dive data, since series 53 is the default series for a professional skydiver. The initial altitude value of 2,700 meters is stored in the memory. This altitude value corresponds to an altitude value of 2,400 meters above the opening altitude value of 300 meters. In other words, the allowed free fall distance is equal to 2,400 meters. From the altitude value 2,400 meters and from the current active series (series 53), the device will determine through linear interpolation between the values 2,222 and 2,490,2 meters (see table 1) that the theoretical free fall duration will be 48.32 seconds.

After a number of measurements, it will be determined that the actual altitude value is for example equal to 1,324 meters, thus 1,024 meters above the opening altitude value. This means that the free fall distance is equal to 2,400–1,024 or 1,376 meters. From the active series of data (series 53), the device will determine, through interpolation between the values 1.149.1 meters and 1,417.3 meters that the theoretical free fall duration is equal to 29.23 seconds.

Suppose now that the free fall duration determined by the time determination means is equal to 26.75 seconds and that the previous sum of differences between the theoretical free fall duration and the determined free fall duration is equal to 0.68 seconds. The new sum of differences is now 0.68+ (29.23−26.75) or 3.16 seconds. Assuming this is the 10$^{th}$ measurement and that the threshold value is 1 second, there is now established that the threshold value is exceeded. Consequently, a new series of theoretical dive data will be selected.

In particular, the new series is selected as follows. The free fall distance since the start of the jump is equal to 1,376 meters. This distance has been reached in 26.75 seconds. It can be determined that the nearest new series of theoretical dive data is series 58.

Series 58 is now the active series of theoretical dive data. From this series, it can be determined that with an initial altitude value equal to 2,700 meters, thus a fall distance equal to 2,400, -meters, the initial theoretical free fall remaining time is equal to 44.46 seconds. The previous steps can be repeated.

According to an alternative, the series of theoretical dive data stored in the memory 3 indicates, for each altitude value, a theoretical free fall remaining time. In the example given eight series of theoretical dive data are shown, each corresponding to a fall speed. It will be clear that more or less series are also conceivable. The more the number of series, the more the results will be accurate. The series between the average fall speed (53 m/s) and the maximum fall speed (83 m/s) are not shown. It should be noted that the altitude value is the altitude value above the opening altitude value, which is for example equal to 300 meters in student or professional mode and 600 meters in tandem mode.

TABLE 2

Free fall remaining time in function of the altitude above opening altitude and speed

FREE FALL REMAINING TIME (SECONDS)

| ALTITUD METERS | Series 23 Minimum | Series 48 | Series 49 | Series 50 | Series 51 | Series 52 | Series 53 Average | Series 83 Maximum |
|---|---|---|---|---|---|---|---|---|
| 9900 | 430.43 | 206.25 | 202.04 | 198.00 | 194.12 | 190.38 | 186.79 | 119.28 |
| 9600 | 417.39 | 200.00 | 195.92 | 192.00 | 188.24 | 184.62 | 181.13 | 115.66 |
| 9300 | 404.35 | 193.75 | 189.80 | 186.00 | 182.35 | 178.85 | 175.47 | 112.05 |
| 9000 | 391.30 | 187.50 | 183.67 | 180.00 | 176.47 | 173.08 | 169.81 | 108.43 |
| 8700 | 378.26 | 181.25 | 177.55 | 174.00 | 170.59 | 167.31 | 164.15 | 104.82 |
| 8400 | 365.22 | 175.00 | 171.43 | 168.00 | 164.11 | 161.54 | 158.49 | 101.20 |
| 8100 | 352.17 | 168.75 | 165.31 | 162.00 | 158.82 | 155.77 | 152.83 | 97.59 |
| 7800 | 339.13 | 162.50 | 159.18 | 156.00 | 152.94 | 150.00 | 147.17 | 93.98 |
| 7500 | 326.09 | 156.25 | 153.06 | 150.00 | 147.06 | 144.23 | 141.51 | 90.36 |
| 1200 | 313.04 | 150.00 | 146.94 | 144.00 | 141.18 | 138.46 | 135.85 | 86.75 |
| 6900 | 300.00 | 143.75 | 140.82 | 138.00 | 135.29 | 132.69 | 130.19 | 83.13 |
| 6600 | 288.96 | 137.50 | 134.89 | 132.00 | 129.41 | 126.92 | 124.53 | 79.52 |
| 6300 | 273.91 | 131.25 | 128.57 | 126.00 | 123.53 | 121.15 | 118.87 | 75.90 |
| 6000 | 260.87 | 125.00 | 122.45 | 120.00 | 117.65 | 115.38 | 113.21 | 72.29 |
| 5700 | 247.83 | 118.75 | 116.33 | 114.00 | 111.76 | 109.62 | 107.55 | 68.67 |
| 5400 | 234.78 | 112.50 | 110.20 | 108.00 | 105.88 | 103.85 | 101.89 | 65.06 |
| 5100 | 221.74 | 106.25 | 104.08 | 102.00 | 100.00 | 98.08 | 96.23 | 61.45 |
| 4800 | 208.70 | 100.00 | 97.96 | 96.00 | 94.12 | 92.31 | 90.57 | 51.83 |
| 4500 | 195.65 | 93.75 | 91.84 | 90.00 | 88.24 | 86.54 | 84.91 | 54.22 |
| 4200 | 182.61 | 87.50 | 85.71 | 84.00 | 82.35 | 80.77 | 79.25 | 50.60 |
| 3900 | 169.57 | 81.25 | 79.59 | 78.00 | 76.47 | 75.00 | 73.58 | 46.99 |
| 3600 | 156.52 | 75.00 | 73.47 | 72.00 | 70.59 | 69.23 | 67.92 | 43.37 |
| 3300 | 143.48 | 68.75 | 67.35 | 66.00 | 64.71 | 63.46 | 62.26 | 39.76 |
| 3000 | 130.43 | 62.50 | 61.22 | 60.00 | 58.82 | 57.69 | 56.60 | 36.14 |
| 2700 | 117.39 | 56.25 | 55.10 | 54.00 | 52.94 | 51.92 | 50.94 | 32.53 |
| 2400 | 104.35 | 50.00 | 48.98 | 48.00 | 47.06 | 46.15 | 45.28 | 28.92 |
| 2100 | 91.30 | 43.75 | 42.86 | 42.00 | 41.18 | 40.38 | 39.62 | 25.30 |
| 1800 | 78.26 | 37.50 | 36.73 | 36.00 | 35.29 | 34.62 | 33.96 | 21.69 |
| 1500 | 65.22 | 31.25 | 30.61 | 30.00 | 29.41 | 28.85 | 28.30 | 18.07 |
| 1200 | 52.17 | 25.00 | 24.49 | 24.00 | 23.53 | 23.08 | 22.64 | 14.46 |
| 900 | 39.13 | 18.75 | 18.37 | 18.00 | 17.65 | 17.31 | 16.98 | 10.84 |
| 600 | 26.09 | 12.50 | 12.24 | 12.00 | 11.76 | 11.54 | 11.32 | 7.23 |
| 300 | 13.04 | 6.25 | 6.12 | 6.00 | 5.88 | 5.77 | 5.66 | 3.61 |
| 0* | 0.00 | 0.00 | 0.00 | 0.00 | 0.00 | 0.00 | 0.00 | 0.00 |
| FALL SPEED | 23 m/sec 82.2 km/h | 48 m/s 172.8 km/h | 49 m/s 176.4 km/h | 50 m/s 180 km/h | 51 m/s 183.6 km/h | 52 m/s 187.2 km/h | 53 m/sec 208.8 km/h | 83 m/sec 298.8 km/h |

These series of data shown in table 2 result in a graph as illustrated in FIG. 5. It should be noted that this alternative is less accurate than the previous method.

Assume a student skydiver uses the device. The selection of the jump mode will be described further with reference to FIG. 3. Assume the jump is started at a initial altitude value equal to 3,000 meters. It should be noted that the altitude value is the altitude with reference to the ground level. The data processing system will select for example the series 49, corresponding to a fall speed of 49 m/s as active series of theoretical dive data, since series 49 is the default series for a student skydiver. The initial altitude value of 3,000 meters is stored in the memory. This altitude value corresponds to an altitude value of 2,700 meters above the opening altitude value of 300 meters. From the altitude value 2,700 meters and from the current active series (series 3), the device will determine (see table 2) that there is an initial theoretical free fall remaining time equal to 55.10 seconds.

After a number of measurements, it will be determined that the actual altitude value is for example equal to 1,624 meters, thus 1,324 meters above the opening altitude value. From the active series of data (series 49), the device will determine, through interpolation between the values 1,200 meters and 1,500 meters that the theoretical free fall remaining time is now equal to 27.02 seconds. Consequently, the theoretical free fall duration is equal to 28.08 seconds (55.10–27.02 seconds).

Suppose now that the free fall duration determined by the time determination means is equal to 26.75 seconds and that the previous sum of differences between the theoretical free fall duration and the determined free fall duration is equal to 0.38 seconds. The new sum of differences is now 0.38+(28.08–26.75) or 1.71 seconds. Assuming this is the $10^{th}$ measurement and that the threshold value is 1 second, there is now established that the threshold value is exceeded. Consequently, a new series of theoretical dive data will be selected.

In particular, the new series is selected as follows. The free fall distance since the start of the jump is equal to 2,700–1,324 or 1,376 meters. This distance has been reached in 26.75 seconds. The altitude change rate is therefore equal to 51.4 meters per second. The nearest new series of theoretical dive data is thus series 51.

Series 51 is now the active series of data. From this series, it can be determined that with an initial altitude value equal to 3,000 meters, the initial theoretical free fall remaining time is equal to 52.94 seconds. The previous steps can be repeated.

Once it is determined that the determined free fall duration reaches the initial theoretical free fall remaining time from the active theoretical dive data and that a given altitude change rate is exceeded, the release signal is generated. The given altitude change rate is in function of the chosen jump mode, for example 13 meters per second for a student skydiver and 25 meters per second for a professional or tandem skydiver. For example, when it has been determined that the skydiver has reached the initial theoretical free fall remaining time with an altitude change rate equal to 80 meters in 5 seconds, the given altitude change rate is not exceeded for a "professional" or "tandem" skydiver, but is exceeded for a "student" skydiver. Consequently, the release signal will be generated if the jump mode is equal to "student", but will not be generated if the jump mode is equal to "professional" or "tandem".

Preferably the last stored jump data is stored as default series of theoretical dive data for a subsequent jump. In this way, the device becomes more accurate the more it is used.

Figure 3:
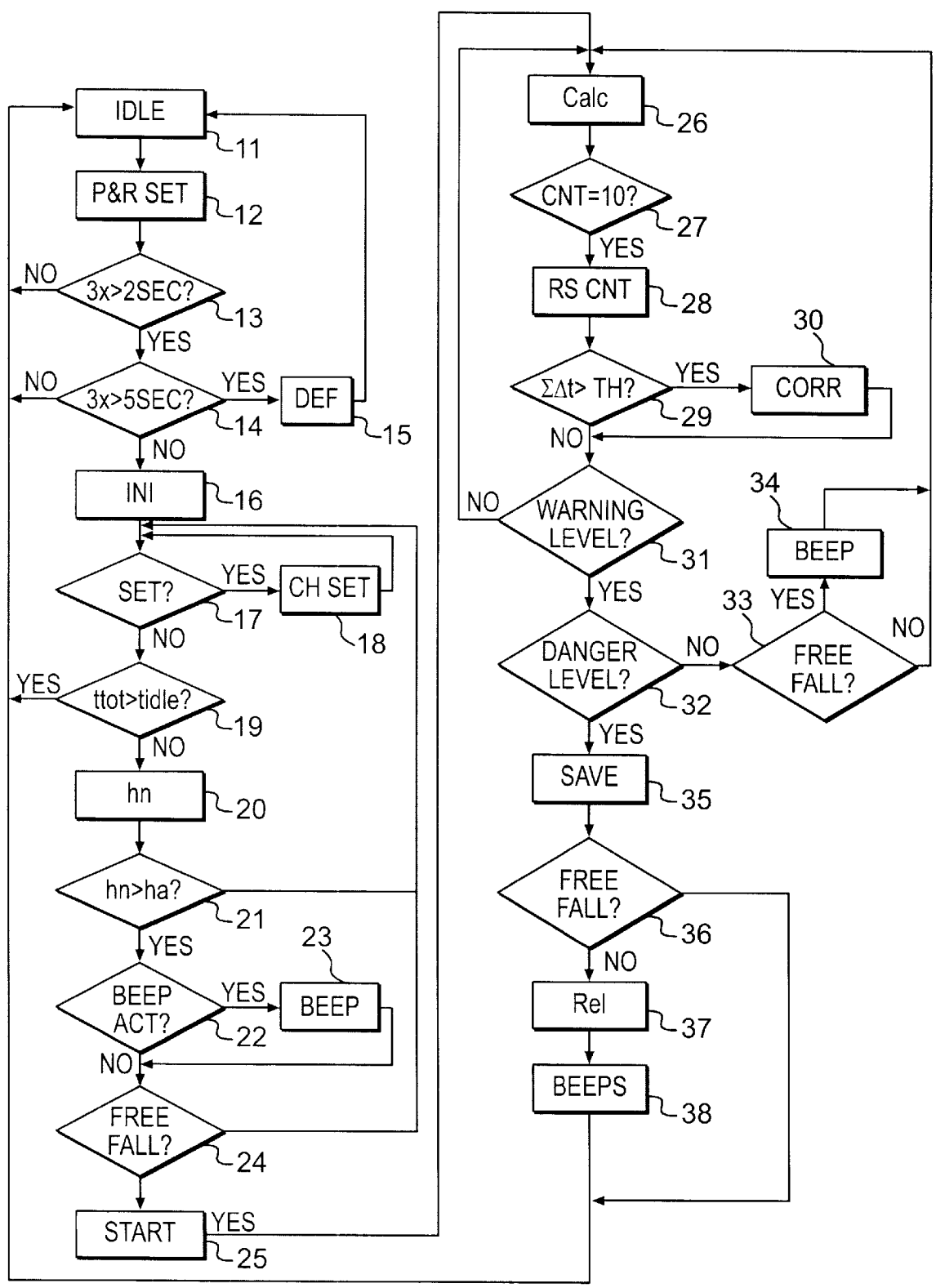
FIG. 3 is a flowchart illustrating an operating procedure of the device according to the invention.

FIG. 3 illustrates by means of a flow chart the operation of the device according to the invention. The different steps are performed under control of the data processing system. The different steps of the operating procedure will now be explained.

11. IDLE:

For saving the batteries, the device is kept in a sleep mode or idle state. In this mode, the device only checks if the set button is pressed. The routine is started once the set button is pressed.

12. P&R SET:

For activating the device, the user presses and releases subsequently the set button a number of times. The release operation is taken into account only if released for at least 2 seconds.

13. 3×>2sec?:

In this step, there is checked if the set button has been pressed three times at least 2 seconds. If no, the routine goes back to the IDLE state 11.

14. 3×>5sec?:

If the set button has been pressed for more than 2 seconds, there is checked if the set button has been pressed three times for at least 5 seconds.

15. DEF:

If the set button has been pressed three times for more than 5 seconds, this means the user wishes to modify the default settings of the device. In this step, the user can select the jump mode and set the real time clock. The jump mode can be set to "student", "professional" or "tandem". The jump modes will determine the default theoretical dive data with which the measured pressure readings will be compared with for determining the theoretical remaining free fall time, as will be explained further. The jump modes will further determine the altitude difference between two measurements within a certain time limit that the skydiver may not exceed when his parachute is open. Assuming two measurement at an interval of 5 seconds, the altitude difference is for example 65 meters In the "student" mode and −125 meters in the "professional" or "tandem" mode. The jump mode will further influence the values determining the height at which a parachute should be opened, for example 300 meters above ground level in "student" and "professional" mode and 600 meters above ground level in the "tandem" mode. The mentioned altitudes are called activation levels. A further parameter could be the status (enabled/disabled) of the global time check, as explained further. Based on the selected jump mode, a default series of theoretical dive data will be set as active theoretical dive data.

16. INI:

If the user presses three times between 2 and 5 seconds on the set button, the system is initialised. In this step, the relative altitude is set to 0, indicating the device is at ground level. Further, the nominal pressure is set equal to the relative pressure, the total timer ($t_{tot}$) is set to 0 and starts counting the duration. The counter is set to 0 and the beeper status is set to active.

17. SET?

There is checked if the set button has been pressed three times by the user for at least 2 seconds.

18. CH SET:

If the user pressed the set button three times for at least 2 seconds, the relative altitude can be adjusted using the human interface 9. This is required if the ground level at the place where the object leaves the ground is different from the ground level at the place where the object should land. This adjustment can be performed by increasing or decreasing the relative altitude parameter which has been set to 0 in the initialisation step.

19. $t_{tot} > t_{idle}$?:

There is checked if the value of the total timer exceeds a threshold value $t_{idle}$. This threshold value is for example equal to 14 hours. If the total timer exceeds the threshold value, the device interprets that the jump has been cancelled. When the threshold value has been reached, the device automatically returns to the idle state 11. This allows to save the batteries, since the device will be automatically shut down to the idle state if the threshold value is reached. Preferably, this step is bypassed by disabling this function in the default settings. In a preferred embodiment, the remaining time before the device is automatically shut down is displayed.

20. $h_n$:

In this step, the nominal pressure is measured. The measured pressure is compared in the data processing system with the ground pressure to determine a nominal altitude value $h_n$. This can be achieved since the altitude is proportional to the pressure. The altitude value is stored in the memory of the device.

21. $h_n > h_a$?:

There is checked if the activation level has been crossed. As explained hereinabove, the activation level is for example equal to 300 meters for "student" and "professional" skydivers and 600 meters for "tandem" skydivers.

22. Beep act?:

There is checked if the beeper status is still set to active.

23. Beep:

The beeper status is set to inactive and the beeper will sound during a determined period of time, alerting the user that the activation level has been crossed. In a preferred embodiment, the sound will be different in function of the chosen jump mode. The beeper will only sound if the device is functioning properly.

24. Free fall?:

There is checked if the diver is in free fall. This is achieved by checking if the altitude difference $\Delta h_n$ between the current nominal altitude and the previous nominal altitude is smaller than a predetermined value $\Delta h_m$. Assuming a measurement each 0.1 second, if "student" mode has been selected, $\Delta h_m$ is equal to −1.3 m. If "professional" or "tandem" mode has been selected, $\Delta h_m$ is equal to −2.5 m. If $\Delta h_n$ is for example equal to −3.4 m, this means the skydiver is in free fall. The device is then in free fall state. If the skydiver is not yet in free fall, the routine returns to step 17.

25. Start:

If is has been determined that the skydiver is in free fall, the dive duration timer is started, enabling to determine anytime the dive duration $t_{fall,meas}$. The initial altitude value $h_{n,ini}$, indicating the altitude at which the jump is started is stored in the memory.

26. Calc:

In this step, there is determined on the basis of the active series of theoretical dive data and the initial altitude value an initial theoretical free fall remaining time $t_{rem,theor,ini}$. Then, a new nominal pressure is measured. The measured pressure is compared in the data processing system with the ground pressure to determine a nominal altitude value $h_n$. This can be achieved since the altitude is proportional to the pressure. The altitude value is stored in the memory of the device. From this nominal altitude value $h_n$ and the active series of theoretical dive data, a theoretical free fall remaining time $t_{rem,theor}$ is determined. The difference between the initial theoretical free fall remaining time $t_{rem,theor,ini}$ and the theoretical free fall remaining time $t_{rem,theor}$ will determine a theoretical free fall duration $t_{fall,theor}$. Then, the measured dive duration $t_{fall,meas}$ is read from the dive duration timer. Then, the difference $\Delta t$ between the measured dive duration $t_{fall,meas}$ and the theoretical free fall duration $t_{fall,theor}$ is determined. This difference is added to the previously calculated differences to obtain a sum of duration differences $\Sigma \Delta t$. Finally, the counter value is incremented with 1.

27. CNT=10?:

There is checked if the counter value is for example equal to 10. If not, the routine returns to step 26.

28. RST CNT: The counter value is reset to 0.

29. $\Sigma \Delta t > TH$?:

There is checked if the sum of the 10 duration differences, exceeds a threshold value, for example 0.5 seconds. If not, the routine goes directly to step 31.

30. CORR:

If the threshold value is exceeded, a correction of the theoretical dive curve will be performed. This is achieved by comparing the measured data with the theoretical data stored in the memory and by retrieving the set of data best matching with the measured data, as explained hereinabove.

31. Warning Level?:

There is checked if the difference between the initial theoretical free fall duration $t_{rem,theor,ini}$ and the measured free fall duration $t_{fall,meas}$ has reached a threshold value, for example 5 seconds. If no, the routine returns to step 26.

32. Danger level?:

There is checked if the measured fall duration $t_{fall,meas}$ has reached the initial theoretical free fall duration $t_{rem,theor,ini}$. If yes, this means that the free fall should have been finished and that the skydiver is in a dangerous situation. If not, this means that the skydiver is in a warning situation.

33. Free fall?:

If the skydiver has reached the warning level but not yet the danger level, there is checked if the skydiver is in free fall or is descending at a normal speed under open parachute. If the altitude difference $\Delta h_n$ between the current nominal altitude and the previous nominal altitude is larger than a predetermined value $\Delta h_m$, for example −0.5 means, this means the skydiver descends with a normal speed under open parachute. Consequently, the routine returns in this case to step 26.

34. Beep:

If the skydiver is still in free fall, he is alerted that the free fall should have been finished by a long beep signal and the routine returns to step 26.

35. Save:

If the skydiver has reached the danger level, the data related to that jump is saved in the memory. If the device also counts the number of jumps, the jump counter is incremented with 1 in this step. In a preferred embodiment, the data is saved as a new series of theoretical dive data, possibly replacing an existing series of data.

36. Free fall?:

This is the same step as step 33. There is thus again checked if the skydiver is in free fall or is descending at a normal speed under open parachute. In the latter case, the routine bypasses steps 37 and 38.

If the skydiver has reached the danger level, the data related to that jump is saved in the memory. If the device also counts the number of jumps, the jump counter is incremented with 1 in this step. In a preferred embodiment, the data is saved as a new series of theoretical dive data, possibly replacing an existing series of data.

36. Free fall?: This is the same step as step 33. There is thus again checked if the skydiver is in free fall or is descending at a normal speed under open parachute. In the latter case, the routine bypasses steps 37 and 38.

37. Rel:

The release signal is generated and the parachute, in particular the reserve parachute, is released.

38. Beeps:

A number of beep signals are output by the device to alert the user and the routine returns to the IDLE state 11.

In the described embodiment, there was mentioned that use is made of a timer. Instead of a timer for counting the jump duration, there could be a counter counting the number of pressure measurements, provided the measurements are performed at fixed intervals. Assume a measurement each 0.1 second. It can easily be determined that after 150 measurements (after it has been determined that the skydiver is in free fall) the jump duration is equal to 15 seconds.

In the described embodiment, the counter value for the number of measurements has been set to 10. It is however conceivable to compare the determined difference after each measurements. Preferably there is taken into account at least 3 measurements. This allows to average the measurements to avoid a misinterpretation in case of an erroneous measurement. This is especially the case when the skydiver performs acrobatic movements.

What is claimed is:

1. A parachute release device provided to be mounted on a parachute, which parachute is provided to be attached to an object, said device comprising:

a data processing system having a release signal output and a memory provided for storing data, said data processing system being provided for generating a release signal for opening said parachute;

altitude determining means connected to said data processing system and provided for determining altitude values; and time determination means provided for determining a free fall duration as from the start of the dive;

wherein said memory is provided for storing a plurality of series of theoretical dive data, said theoretical dive data indicating for each distance value a corresponding theoretical time;

said data processing system is further provided for selecting a series of theoretical dive data in function of the determined altitude values and the determined free fall duration.

2. The device of claim 1, wherein said distance value indicates a fall distance, said theoretical time indicates a free fall duration and the data processing system is provided for selecting a series of theoretical dive data in function of the determined altitude values and the determined free fall duration by:

a) selecting a default series of theoretical dive data among said series of theoretical dive data as active series of theoretical dive data, b) storing an initial altitude value ($h_{n,ini}$) when said dive is started;

c) determining, on the basis of said active series of theoretical dive data and said initial altitude value an initial theoretical free fall remaining time ($t_{rem,theor,ini}$);

d) determining, on the basis d an actual altitude value ($h_n$) and the initial altitude value ($h_{n,ini}$) the corresponding fall distance ($\Delta h_{fall}$);

e) determining, on the basis of said active series of theoretical dive data and said fall distance ($\Delta h_{fall}$) a theoretical free fall duration ($t_{fall,theor}$);

f) determining a sum of a predetermined number of differences between said theoretical free fall duration ($t_{fall,theor}$) with the free fall duration ($t_{fall,meas}$) determined with the time determination means;

g) selecting, upon establishing that said sum exceeds a threshold value, a further series of theoretical dive data as active series of theoretical dive data; and, h) generating said release signal when said determined free fall duration ($t_{fall,meas}$) reaches said initial theoretical free fall remaining time ($t_{rem,theor,ini}$) and a given altitude change rate is exceeded.

3. The device of claim 1, wherein said distance value indicates an altitude value, said theoretical time indicates a theoretical free fall remaining time and the data processing system is provided for selecting a series of theoretical dive data in function of the determined altitude values and the determined free fall duration by:

a) selecting a default series of theoretical dive data among said series of theoretical dive data as active series of theoretical dive data, b) storing an initial altitude value ($h_{n,ini}$) when said dive is started;

c) determining, on the basis of said active series of theoretical dive data and said initial altitude value an initial theoretical free fall remaining time ($t_{rem,theor,ini}$);

d) determining, on the basis of an actual altitude value ($h_n$) and the active theoretical dive data the corresponding theoretical free fall remaining time ($t_{rem,theor}$), e) determining, on the basis of said initial theoretical free fall remaining time ($t_{rem,theor,ini}$) and the corresponding theoretical free fall remaining time ($t_{rem,theor}$) a theoretical free fall duration ($t_{fall,theor}$);

f) determining a sum of a predetermined number of differences between said theoretical free fall duration ($t_{fall,theor}$) with the free fall duration ($t_{fall,meas}$) determined with the time determination means;

g) selecting, upon establishing that said sum exceeds a threshold value, a further series of theoretical dive data as active series of theoretical dive data; and h) generating said release signal when said determined free fall duration ($t_{fall,meas}$) reaches said initial theoretical free fall remaining time ($t_{rem,theor,ini}$) and a given altitude change, rate is exceeded.

4. The device of claim 2, wherein the predetermined number is at least 3, and preferably at least 10.

5. The device of claim 3, wherein the predetermined number is at least 3, and preferably at least 10.

6. The device of claim 2, further comprising means for generating a warning signal upon establishing that the difference between the initial theoretical free fall remaining time and the determined free fall duration has reached a threshold duration value.

7. The device of claim 6, further comprising means for generating a further warning signal upon establishing that said determined altitude value has crossed a threshold altitude value.

8. The device of claim 2, further comprising means for selecting a jump mode, each jump mode being dedicated to said default theoretical dive data.

9. The device of claim 8, wherein said given altitude change rate is in function of the selected jump mode.

10. The device of claim 1, wherein said altitude determining means comprise a pressure sensor provided for determining a ground pressure and further pressure measurements.

11. The device of claim 10, further comprising means for adjusting said determined ground pressure.

12. A parachute release device provided to be mounted on a parachute, which parachute is provided to be attached to an object, said device comprising:

a data processing system having a release signal output and a memory provided for storing data, said data processing system being provided to generate a release signal for opening said parachute;

a pressure sensor connected to said data processing system and provided to determine altitude values; and a counter provided to determine a free fall duration as from the start of a dive;

wherein said memory is provided to store a plurality of series of theoretical dive data, said theoretical dive data indicating for each distance value a corresponding theoretical time; and said data processing system is further provided to select a series of theoretical dive data in function of the determined altitude values and the determined free fall duration.

13. A method for releasing a parachute, comprising steps of:

determining altitude values;

determining a free fall duration as from the start of a dive;

storing a plurality of series of theoretical dive data by a memory, wherein said theoretical dive data indicates for each distance value a corresponding theoretical time;

selecting a series of theoretical dive data in function of the determined altitude values and the determined free fall duration by a data processing system having a release signal output; and generating a release signal for opening said parachute by said data processing system.

14. The method of claim 13, wherein said distance value indicates a fall distance, said theoretical time indicates a free fall duration, further comprising:

selecting a default series of theoretical dive data among said series of theoretical dive data as active series of theoretical dive data, storing an initial altitude value ($h_{n,ini}$) when a dive is started;

determining, on the basis of said active series of theoretical dive data and said initial altitude value ($h_{n,ini}$), an initial theoretical free fall remaining time ($t_{rem,theor,ini}$);

determining, on the basis of an actual altitude value ($h_n$) and said initial altitude value ($h_{n,ini}$), the corresponding fall distance ($\Delta h_{fall}$);

determining, on the basis of said active series of theoretical dive data and said fall distance ($\Delta h_{fall}$), a theoretical free fall duration ($t_{fall,theor}$);

determining a sum of a predetermined number of differences between said theoretical free fall duration ($t_{fall,theor}$) with said free duration ($t_{fall,meas}$) determined with said counter;

selecting, upon establishing that said sum exceeds a threshold value, a further series of theoretical dive data as active series of theoretical dive data; and generating a release signal for opening said parachute when said determined free fall duration ($t_{fall,meas}$) reaches said initial free fall remaining time ($t_{rem,theor,ini}$) and a given altitude change rate is exceeded.

15. The method of claim 14, wherein the predetermined number is at least 3, and preferably at least 10.

16. The method of claim 14, further comprising generating a warning signal upon establishing that the difference between said initial theoretical free fall remaining time and the determined free fall duration has reached a threshold duration value.

17. The method of claim 16, further comprising generating a further warning signal upon establishing that said determined altitude value has crossed a threshold altitude value.

18. The method of claim 14, further comprising selecting a jump mode, each jump mode being dedicated to said default theoretical dive data.

19. The method of claim 13, wherein said distance value indicates an altitude value, said theoretical time indicates a theoretical free fall remaining time, further comprising:

selecting a default series of theoretical dive data among said series of theoretical dive data as active series of theoretical dive data, storing an initial altitude value ($h_{n,ini}$) when a dive is started;

determining, on the basis of said active series of theoretical dive data and said initial altitude value ($h_{n,ini}$), an initial theoretical free fall remaining time ($t_{rem,theor,ini}$);

determining, on the basis of an actual altitude value ($h_n$) and said active theoretical dive data, the corresponding theoretical free fall remaining time ($t_{rem,theor}$);

determining, on the basis of said initial theoretical free fall remaining time ($t_{rem,theor,ini}$) and said corresponding free fall remaining time ($t_{rem,theor}$), a theoretical free fall duration ($t_{fall,theor}$);

determining a sum of a predetermined number of differences between said theoretical free fall duration ($t_{fall,theor}$) with said free duration ($t_{fall,meas}$) determined by said counter;

selecting, upon establishing that said sum exceeds a threshold value, a further series of theoretical dive data as active series of theoretical dive data; and generating a release signal for opening said parachute when said determined free fall duration ($t_{fall,meas}$) reaches said initial free fall remaining time ($t_{rem,theor,ini}$) and a given altitude change rate is exceeded.

20. The method of claim 19, wherein said predetermined number is at least 3, and preferably at least 10.

* * * * *